United States Patent [19]

Yoshida et al.

[11] Patent Number: 4,887,188

[45] Date of Patent: Dec. 12, 1989

[54] CONNECTOR FOR A MEMORY CARD

[75] Inventors: Junichi Yoshida; Shinichi Sugano; Masaaki Koike, all of Tokyo, Japan

[73] Assignee: Casio Computer Co., Ltd., Tokyo, Japan

[21] Appl. No.: 240,918

[22] Filed: Sep. 6, 1988

[30] Foreign Application Priority Data

Dec. 22, 1987 [JP] Japan .................................. 326493
Dec. 23, 1987 [JP] Japan .................................. 323836

[51] Int. Cl.$^4$ ............................................. H01R 23/68
[52] U.S. Cl. .................... 361/413; 361/394; 361/415
[58] Field of Search ............ 200/50 A, 50 R; 361/394, 395, 399, 412–415; 439/152, 353, 377

[56] References Cited

U.S. PATENT DOCUMENTS

| 3,767,974 | 10/1973 | Donovan, Jr. et al. | 361/415 |
| 3,932,716 | 1/1976 | Mottel et al. | 361/399 |
| 4,216,522 | 8/1980 | Slagel et al. | 361/392 |
| 4,454,552 | 6/1984 | Barnes et al. | 361/413 |
| 4,609,829 | 9/1986 | Milby et al. | 361/415 |
| 4,716,495 | 12/1987 | Craker | 361/415 |
| 4,777,332 | 10/1988 | Diaz | 200/50 A |

FOREIGN PATENT DOCUMENTS

59-144924 8/1984 Japan .

Primary Examiner—Gregory D. Thompson
Attorney, Agent, or Firm—Frishauf, Holtz, Goodman & Woodward

[57] ABSTRACT

A connector for receiving a memory card employs a power supply switching mechanism, a memory card ejecting mechanism and a memory card lock mechanism. A connector body on which a plurality of connecting terminals to be connected with the memory card is mounted has a one piece structure with a pair of guide arms for slidably guiding the memory card. One of the guide arms is formed with a groove, where power supply terminal electrodes and a switching member are attached. An actuating member with a locking member and an actuator with an ejector member are also attached to the connector body. Operation of the actuating member is accompanied with the movements of the locking member, the switching member and the actuator. Movement of the locking member causes the memory card to lock, the switching member switches on the power supply, and the actuator serves to eject a card. Thus, the power supply switching mechanism, the memory card ejecting mechanism and the memory card lock mechanism are linked to one another so as to perform their functions in accordance with the operation of the actuating member. The connector increases efficiency in assembling electronic appliances and enables an easy operation to load and unload the memory card.

11 Claims, 4 Drawing Sheets

CONNECTOR FOR A MEMORY CARD

BACKGROUND OF THE INVENTION

1. Field of the Invention

The present invention relates to a connector for a memory card used to connect the memory card with a circuit board embodied in an electronic apparatus.

2. Description of the Related Art

A memory card, which includes IC (Integrated Circuit) chips such as a RAM (Random Access Memory) chip, a ROM (Read Only Memory) chip, a CPU (Center Processor Unit) chip and an like, is detachably attached to the electronic apparatus.

In these electronic apparatus, a connector having connecting pins to be connected to the memory card is disposed in the vicinity of an opening which is formed in the housing of the apparatus for receiving the memory card. When the memory card is inserted into the opening of the apparatus, a rearward portion of the memory card is extruded outside of the housing of the apparatus so that the memory card can be easily pulled out by holding the outwardly extending rearward portion. In this case, one end of connecting pins arranged on the connector are connected in a detachable manner to connecting terminals of the memory card and the other ends of the connecting pins of the connector are coupled to connecting terminals of the circuit board embodied in the electronic apparatus.

However, the apparatus to which the memory card is inserted with its rear part extending outside the apparatus allows the memory card to be pulled out during a data processing operation by mistake, and brings destruction of the data stored in a memory chip. Another apparatus has been known which employs a fool safe structure to avoid the above memtioned accident. That is, the apparatus receives and holds the memory card in the inside of the electronic apparatus and does not allow the memory card to be pulled out until the power switch is turned off.

Japanese Patent Disclosure No. 59-144924 discloses an example of such a safety-guard structure. The above mentioned prior art discloses a safety-guard structure wherein the memory card received in the apparatus is covered with a covering member. A slide member of the power switch latches the covering member, so as to prevent it from uncovering unless the power switch is turned off. When the slide member of the power switch is locked by a locking member, the slide member is not allowed to move to the off-position.

However, it is a bother for the user to handle these apparatus, as both the locking member and the power switch have to be operated respectively and then the covering member has to be opened by hand to pull out the memory card.

Furthermore, the main problem of the conventional technique mentioned above lies in the structure to mount the loading mechanism of the memory card switch, the locking member used in the power switch, and the like.

It is an object of the present invention to provide a connector for a memory card in which it is easy to load and unload the memory card, and to attain efficient development and productivity of the apparatus by alleviating the design work required to produce new models.

According to the present invention, a connector for a memory card comprises a connector body for receiving a memory card, the connector body having a one piece structure which includes a central portion and a pair of guide arms, the guide arms being disposed at spaced apart positions along the width direction of the memory card so as to form a receiving space for receiving the memory card. A plurality of connecting terminals are mounted on the central portion of the connector body; and a card ejecting device is mounted on the connector body, the ejecting device including an actuator for ejecting the memory card away from the card receiving space. A power supply is mounted on the connector body, the power supply including at least two terminal electrodes which are arranged to make and break contact with each other; and a switch for causing the at least two terminal electrodes to selectively make contact or break contact. An actuating member mounted on the connector body for moving the actuator of the ejecting device between a memory card receiving position and a memory card ejecting position and for moving the switch between an on-position to cause the at least tow terminal electrodes to contact and an off-position to cause the at least two terminal electrodes to break contact, responsive to an operation of the actuating member.

BRIEF DESCRIPTION OF THE DRAWINGS

FIGS. 3A to 3C are plan views to demonstrate a manner in which the memory card is loaded on or unloaded from the connector, in which FIG. 3A shows a state in which the memory card is engaged with the connector, bringing a power switch to the on-position, FIG. 3B shows a state in which the memory card is engaged with connector, while the power switch is brought to the off-position, and FIG. 3C shows a state in which the memory card is brought to the ejecting position of the connector;

FIGS. 4A to 4C are plan views of the second embodiment of the present invention, in which FIG. 4A shows a state in which the memory card is engaged with the connector, bringing the power switch to the on-position, FIG. 4B shows a state in which the memory card is engaged with the connector, while the power switch is brought to the off-position, and FIG. 4C shows a state in which the memory card is brought to the ejecting position of the connector.

DETAILED DESCRIPTION

First Embodiment

A first embodiment of a connector for a memory card according to the present invention will be described with reference to FIGS. 1, 2 and 3A-3C.

Figure 1:
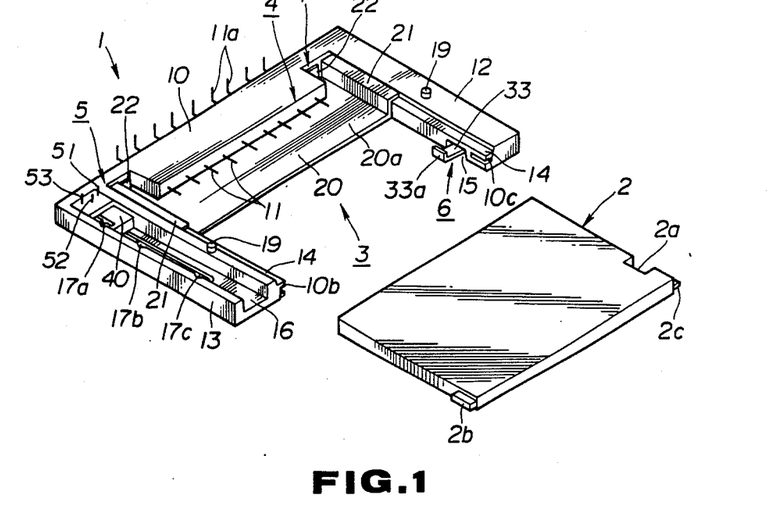
FIG. 1 is a perspective view showing the outer appearances of a connector and a memory card according to an embodiment of the present invention.
Figure 2:
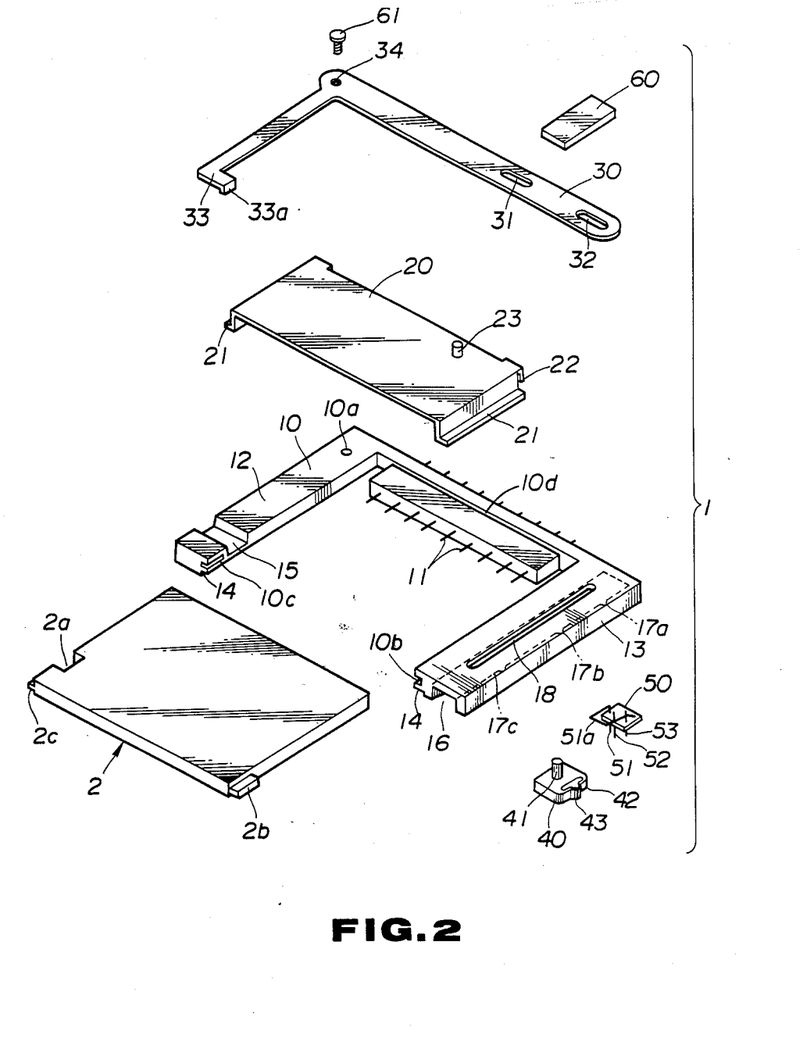
FIG. 2 is a exploded view of a connector from the bottom of the connector of FIG. 1.

FIG. 1 is the perspective view showing the outer appearances of the connector designated generally by the numeral 1 and of the memory card 2. FIG. 2 is an exploded view showing each member of the connector as seen from its bottom.

The connector 1 for the memory card is provided with a receiving space designated generally by the numeral 3 for slidably receiving the memory card 2, a connecting portion 4 for electrically connecting with the memory card 2, a power supply switching mechanism 5, a lock mechanism 6 for preventing the memory card 2 from being ejected manually or by a shock, while the memory card 2 is connected with said connecting portion 4, and a memory card ejecting mechanism 7 for ejecting the memory card 2, when a power supply switch is in its open position. The memory card 2 is a card having a width of 50 mm, a length of 35 mm, and a thickness of 2 to 3 mm. The memory card 2 enbodies IC chips such as RAM chips, ROM chips, CPU chips, and carries female connecting pins (not shown) at its portion facing to the memory-card connector 1. The small sized memory card is disclosed by Japanese application 62-55323 (utility model) filed by the same applicant on Apr. 14, 1987. The memory card 2 has a cut out 2a penatrating in the thickness directin on a side portion. The functional details of the cut out 2a will be described hereinafter. The memory card 2 is provided with a relatively thick projection 2b at its rearward side wall and another projection 2c at the other rearward side wall, which is thinner than the projection 2b. These projections 2b, 2c are adapted to slide into grooves formed in the connector 1, as will be described hereinafter.

The construction of the memory-card connector 1 will be now described in detail. The overall shape and dimension of the memory-card connector 1 are determined depending on a connector body 10.

The connector body 10 has a number of male connecting pins (connecting terminals) 11 on an inner wall of the middle portion which are adapted to be connected with the female connecting pins of the memory card 2 and has a pair of guide arms 12, 13 mounted on both sides of the male connecting terminal 11 so as to form the receiving space 3 for receiving the memory card 2. The guide arms 12, 13 are respectively formed with depression portions 14 at the inner side over the entire length, respectively. The depression portions 14 guide an actuator 20 (which is part of ejecting mechanism 7) slidably in order to eject the memory card 2. Operation of the actuator will be described hereinafter. The grooves 15 and 16 are respectively formed on the arms 12 and 13 The groove 16 extends along the longitudinal direction of the arm 13. The notches 17b, 17b and 17c are formed on the inner side wall of the groove 16. A through slot 18 is longitudinally formed at the bottom of the arm 13. The notches 17a, 17b, and 17c are provided for engaging with a sliding member (switching piece) 40 and the through slot 18 is provided for coupling the sliding member 40 with a manipulating knob 60 through actuating plate (member) 30. Positioning projections 19 are provided on the upper surface of the connector body 10, at the central portion of the guide arms 12, 13. The positioning pins 19 are employed to install the connector 1 to an electronic apparatus. The guide arms 12, 13 are formed at their inner sides with grooves 10b and 10c for slidably receiving the projection 2b and 2c of the memory card 2, respectively. The groove 10c has such a width as to allow only the protection 2c of the memory card 2 to slide into it and to prevent the protection 2b from sliding into it. This construction provides a preventive mechanism for (i) the upside down insertion of the memory card 2, and (ii) the reverse insertion. Namely, if the memory card 2 should be inserted inversely in its inserting direction, in other words, if it should be inserted with the female connecting pins (not shown) facing rearward, the memory card 2 is received by the grooves 10b, 10c of the guide arms 12, 13. Such an erroneous insertion of the memory card will be immediately noticed by the user in this embodiment. That is, as the grooves 10b, 10c extend longitudinally along the guide arms 12, 13 only to a short length from their front end, even if the memory card 2 is inserted by mistake as mentioned above, the memory card 2 slides against the extreme ends of the grooves 10b, 10c, being prevented it further slide from a further sliding movement. Accordingly, the user immediately notices the erroneous insertion of the memory card at the time the memory card 2 comes to the extreme ends of the grooves 10b, 10c, so that the connecting pins 11 and the memory card 2 are prevented from being damaged by the erroneous insertion of the memory card which can happen in the conventional connectors. The male connector pins 11 coupled to the connector body 10 are bent upwardly at the outside of connector body 10 and the upper ends 11a of the connector pins 11 are coupled to connecting terminals of a circuit board.

The actuator 20 is made from a thin metal plate such as aluminum or stainless steel. The width of the actuator 20 is a little smaller than the width of the receiving space 3 formed between the guide arms 12 and 13 of the connector body 10. The actuator 20 is provided with flanges 21 at both sides, which are slidably supported upon the depression portions 14 of the guide arms 12, 13. The actuator 20 is also provided with upstanding pieces (projecting pieces) 22 at its front end for abutting on the front surface of the memory card 2 to eject the memory card 2. A connecting pin 23 is fixed onto a surface of the actuator 20 by means of appropriate means such as welding. The connecting pin 23 serves to move the actuator 20 along the guide arms 12, 13 of the connector body 10 in association with the actuating plate 30.

The actuating plate 30 is formed of a metal plate or synthetic resin and has a length bridging the guide arms 12 and 13 of the connector body 10. The actuating plate 30 is formed with an elongated slot 31 through which the connecting pin 23 fixed on the actuator 20 extends. The plate 30 is also formed with another elongated slot 32 for inserting a link stud 41 on the sliding member 40. The link stud 41 is extended through the through slot 18 in the connector body 10 to the elongated slot 32. At its one end, the actuating plate 30 has an arm extended in the tranverse direction. The arm carries a locking piece 33 at its end portion. The actuating plate 30 is rotatably mounted onto an under surface of the connector body 10 by securing a stepped screw 61 extending through a slot 34 in the plate 30 into a screw hole 10a in the connector body 10. In this case, the locking piece 33 is located at a position to face toward the groove 15 of the guide arm 12. The locking piece 33 has a portion 33a upwardly bent into the connector body 10, as viewed in FIG. 1. The bent portion 33a is shorter than the depth of the groove 15 so that the bent portion 33a can pass through the groove 15 of the guide arm 12, when the actuating plate 30 is rotated about the stepped screw 61.

The sliding member 40 is made by means of an injection molding, the sliding member 40 includes a resilient portion 42 with a projecting part 43 and the link stud 41 as a part of member 40. The sliding member 40 is slidably moved along the groove 16 of the guide arm 13 with the link stud 41 extending through the through slot 18 in the guide arm 13. In this case, the projecting part 43 of the resilient portion 42 of the sliding member 40 is brought into a light engagement with the notches 17a, 17b and 17c formed in the guide arm 13.

A contacting plate 50 (FIG. 2) is fixed to the inside of the groove 16 of the guide arm 13 at an extreme position of the arm 13 away from the notch 17a formed in its inner wall. The contacting plate 50 has terminal pins (electrodes) 51, 52 and 53 which has one ends and the other ends exposed from upper and bottom surfaces of the plate 50 and fixed thereto respectively. The terminal pin 51 is made of a resilient wire and has a bent portion 51a bent toward the sliding member 40 and contacted with the terminal pin 53. The bent portion 51a of the terminal pin 51 is urged by spring force to turn clockwise at the state of FIG. 2 so that the bent portion 51a is normally in contact with the terminal pin 53 under the influence of the pre-determined spring force. However, when the sliding member 40 occupies a position in which the projecting part 43 of the resilient portion 42 is engaged with the farthest notch 17a in the groove 16 of the guide arm 13, the sliding member 40 pushes the bent portion 51a of the terminal pin 51 to bring it out of contact with the terminal pin 53, and transfers it to a position where the bent portion 51a is in contact with the terminal pin 52. The terminal pin 51 is adapted to be connected to a predetermined operation circuit such as a regulator of a power supply and the like, the terminal pin 52 to the power supply such as batteries, and the terminal pin 53 to the ground circuit. These terminal pins 51, 52 and 53 (which comprises part of a power means) serve to connect the power supply, when the sliding member 40 stays at a position where the member 40 engages with the notch 17a in the guide arm 13 and serves to disconnect the power supply and to connect the operation circuit to the ground, when the sliding member 40 stays at a position other than the position mentioned above.

A manipulating knob 60 has in its surface a hole into which the fixing stud 41 of the sliding member 40 is pressed.

The memory-card connector 1 comprises the component parts mentioned above. To assemble these parts, the contacting plate 50 carrying the terminal pins 51, 52 and 53 is initially arranged within the groove 16 of the connector body 10. In this case, the contacting plate 50 can be secured in the groove 16 by pressing or by using screw. Then, the sliding member 40 is arranged in the groove 16 with the link stud extending through the through slot 18 in the guide arm 13. The sliding member 40 is placed at a position where the resilient portion 42 of the sliding member 40 engages with the notch 17a in the wall of the groove 16. The actuator 20 is mounted on the connector body 10 with the flanges 21 of the actuator 20 supported on depression portions 14 of the guide arms 12, 13. The actuator 20 is placed at the deepest position, or at the extreme left position of the groove 16, as viewed in FIG. 1. The connector body 10 is provided with an escape groove 10d (FIG. 2) for receiving the actuator 20. The actuator 20 is slidably mounted on the connector body 10 by means of the stepped screw 61 with the connecting pin 23 stood on the actuator 20 extending through the elongated slot 31 in the actuating plate 30, and with the link stud 41 on the sliding member 40 extending through the elongated slot 32 in the actuating plate 30. The the assembly is completed by pressing the manipulating knob 60 onto the link stud 41 of the sliding member 40.

In the memory-card connector 1 assembled in the manner described above, a manipulation of the manipulating knob 60 causes the sliding member 40 to slide along the groove 16 in the connector body 10, causing the actuating plate 30 to rotate about the stepped screw 61, thereby allowing the locking piece 33 of the actuating plate 30 to pass through over the groove 15 in the guide arm 12. The actuator 20 linked to the actuating plate 30 by the connecting pin 23 is slidable along the depression portions 14 longitudinally formed in the guide arms 12 and 13.

Operation of the memory-card connector 1 will be described in detail with reference to FIG. 3A to FIG. 3C.

Note that in the following description, positions where the sliding member 40 engages with the notches 17a, 17b and 17c in the connector body 10 will be referred to as an on-position, an off-position and an eject-position, respectively.

Figure 3A:
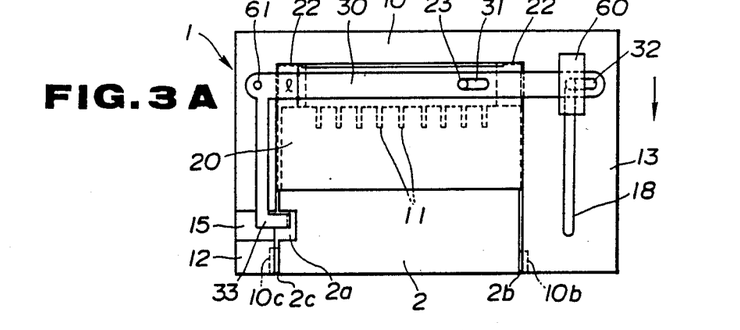

FIG. 3A shows a state where the memory card 2 is connected to the memory-card connector 1. In this state, the sliding member 40 occupies a position where the gibbous part 43 of the slide member 40 engages with the notch 17a in the guide arm 13, that is, the on-position. When the sliding member 40 occupies the on-position, the terminal pin 51 of the contacting plate 50 is in contact with the terminal pin 52, with the bent portion 51a of the terminal pin 51 being brought by the sliding member 40 out of contact with the terminal pin 53. In this state, the power supply is connected. Also in this state, the locking piece 33 of the actuating plate 30 stays inside the guide arm 12 to enter into the cut jout 2a formed in the memory card 2. Therefore, the abutment of the locking piece 33 enters the cut out 2 of the memory card 2 and prevents the memory card 2 from being pulled out from the connector body 10.

The projection 2b, 2c on the memory card 2 are slidably inserted into the grooves 10b, 10c in the connector body 10. The female connecting pins (not shown) provided on the front portion of the memory card 2 are coupled to the male connecting pins 11 arranged on the connector body 10 and the rear portion of the memory card 2 is supported by the grooves 10b, 10c, whereby the memory card 2 is held in the connector body 10. In this manner, the grooves 10b, 10c in the connector body 10 also serve as a supporting member for the memory card 2.

Figure 3B:
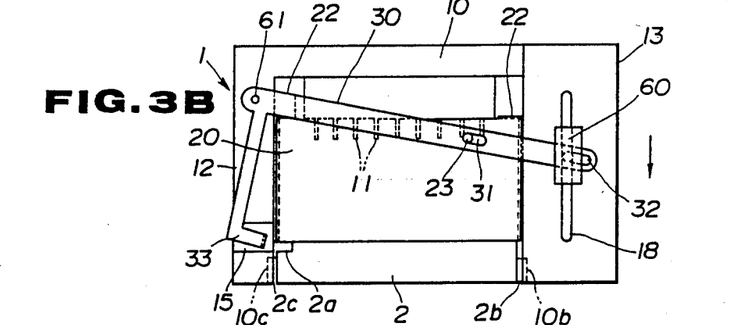

FIG. 3B shows a second state of the memory-card connector 1, in which the sliding member 40 occupies the off-position. A manipulation of the manipulating knob 60 in the direction indicated by the arrow from the position shown in FIG. 3A causes the sliding member 40 to move to the off-position, i.e., a position where the projecting part 43 of the sliding member 40 engages with the notch 17b in the guide arm 13. When the sliding member 40 is moved to the off-position, the bent portion 51a of the terminal pin 51 turns about the terminal pin 51 under the spring back force, as mentioned above, thereby bringing the terminal pin 51 of the contacting plate 50 out of contact with the terminal pin 52 and in contact with the terminal pin 53. Thus, the power supply is disconnected, thereby keeping the ground potential. Movement of the manipulating knob 60 in a direction indicated by the arrow causes the actuating plate 30 to turn about the stepped screw 61 in a clockwise direction, thereby transferring the locking piece 33 on the actuating plate 30 outside the guide arm 12 to retire from the sliding path of the memory card 2. In association with the turning movement of the actuating plate 30, the actuator 20 slides in the direction indicated by the arrow with its connecting pin 23 extending through the elongated slot 31 in the actuating plate 30. There is provided a space designated by a symbol 1 (FIG. 3A) between the upstanding pieces 22 on the actuator 20 and the front end surface of the memory card 2. A travel distance of the actuator 20 in its off-position is chosen to be shorter than a length of 1, so that the connection of the male connecting pins 11 of the memory-card connector 1 and the female connecting pins of the memory card may be maintained.

Figure 3C:
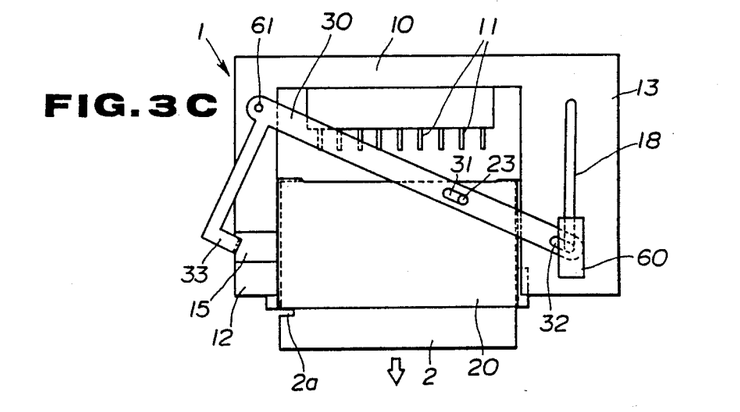

FIG. 3C shows a third state where the sliding member occupies its ejecting position. The further movement of the manipulating knob 60 in the direction indicated by the arrow transfers the sliding member 40 to its ejecting position, i.e., a position where the projecting of the sliding member 40 engages with the notch 17c in the guide warm 13. In this state, the power supply is still disconnected. The actuating plate 30 further turns in a clockwise direction and the actuator 20 slides. In this case, the upstanding piece 22 of the actuator 20 abuts on the front end surface of the memory card 2 to push out the memory card 2 towards the direction indicated by the arrow. The memory card 2 reaches its ejecting position as shown in FIG. 3C with its projections 2b, 2c sliding along the grooves 10b, 10c formed in the guide arms 12, 13. At the same time, the female connecting pins (not shown) of the memory card 2 are brought out of contact with the male connecting pins 11 of the connector body 10, whereby the memory card 2 is disconnected from the memory-card connector 1. Accordingly, the user can pull out the memory card 2 from the memory-card connector 1 by holding the rear end portion of the memory card 2 with his fingers.

For loading the memory card 2 into the memory-card connector 1 again, the sliding member 40 must have been returned to its off-position as indicated in FIG. 3B by a manipulation of the manipulating knob 60. Then, the memory card 2 is inserted into the memory-card connector 1 with its female connecting pins (not shown) facing towards the connector 1. In this case, if the memory card 2 should be inserted upside down, as the projection 2b provided on the memory card 2 abuts on the groove 10c in the connector body 10, the memory card 2 is prevented from being improperly inserted. If the memory card 2 is inserted with its rear end portion forward, the memory card 2 cannot be further inserted at the time the projections 2b, 2c on the memory card 2 abut on the extreme ends of the connector body 10. Hence, the memory card 2 and the memory-card connector 1 are prevented from being damaged. When the memory card 2 is properly inserted into the memory-card connector 1, the memory card 2 is slidably guided along the inner surfaces of the guide arms 12, 13 of the connector body 10. After the front end portion of the memory card 2 has reached the actuator 20 shown in FIG. 3B, the memory card 2 is also guided by the bottom 20a (FIG. 1) of the actuator 20. Accordingly, an inserting movement of the memory card 2 from this position into the connector 1 allows the female connecting pins (not shown) of the memory card 2 to be connected with the male connecting pins 11 of the connector body 10. The projections 2b, 2c of the memory card 2 are inserted into the grooves 10b, 10c in the guide arms 13, 12, respectively. Note that when the memory card 2 is loaded in the connector 1, even if the manipulating knob 60 has been set, by mistake, to the on-position, the locking piece 33 of the actuating plate 30 stays inside the sliding path of the memory card 2 as shown in FIG. 1, thereby obstructing the insertion movement of memory card 2. In this manner, an improper insertion of the memory card 2 is prevented.

Thereafter, the manipulating knob 60 is transferred to its on-position shown in FIG. 3A and a data processing operation of the memory card 2 is executed.

In the above mentioned embodiment, the manipulation for changing the on-position, the off-position, or the eject-position depends on linear movement. However, manipulation of the manipulating knob 60 can be made different in the direction of movement for changing "on" to "off" positions or "off" to "eject" positions. An embodiment of such a different construction is described below.

Second Embodiment

Figure 4A:
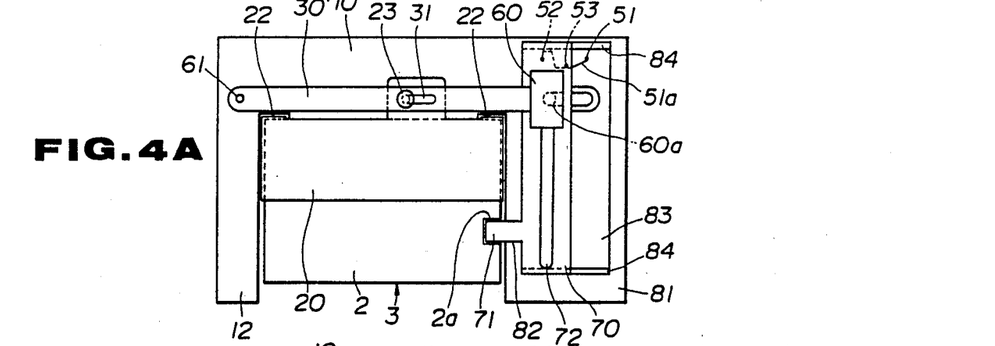
Figure 4B:
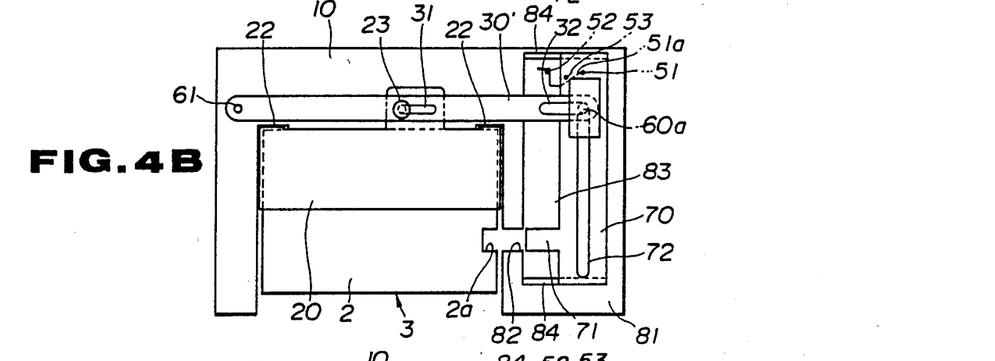

FIGS. 4A to 4B show the second embodiment of the present invention.

In the second embodiment, the same reference numerals as in the first embodiment which represent the same member of the first embodiment are used, and a further description thereof will be omitted.

In the second embodiment, the symbol 70 represents a locking plate. The actuating plate 30' in the second embodiment does not have the locking piece 33 unlike the first embodiment. The locking plate 70 is formed with a locking piece 71. The locking plate 70 is arranged across the actuating plate 30' at right angles. The locking plate 70 is provided with a longitudinally elongated slot 72 and is arranged overlapping the actuating plate 30' so that both the upper edge portion of the elongated slot 72 and the elongated slot 32 permit a rod 60a of the manipulating knob 60 to extend through them. In other words, the rod 60a of the manipulating knob 60 extends through both the elongated slot 32 in the actuating plate 30' and the elongated slot 72 in the locking plate 70. In this case, the locking plate 70 is arranged underlying the actuating plate 30'.

The guide arm 81 of the connector body 10 is provided with a groove 82 through which the locking piece 71 of the locking plate 70 goes and also a groove 83 having a width wider than the locking plate 70. The groove 83 is made a little wider than the total dimension of the width of the locking plate 70 and the length of the locking piece 71. The groove 83 is provided at its upper and lower ends with depression portions 84 on which the locking plate 70 slides laterally as viewed in FIG. 4A. A terminal pin 51 with a bent portion 51a, terminal pins 52 and 53 are mounted on the upper end portion of the groove 83. The terminal pins 51, 52 and 53 have a similar function to those of the first embodiment. They are different in that the terminal pins are fixed directly to the connector body 10 but not to the contacting plate 50 as in the first embodiment. Another difference from the first embodiment is that the groove 83 is provided on the rear surface side of the connector body 10. Therefore, as clearly shown in FIG. 4A, the connector body 10 is not required to be provided with the through shot 18 so that the assembly of the connector 1 of the second embodiment can be performed more efficiently. A slide member of about the same shape as the manipulating knob 60 is fixed to the shaft 60a of the manipulating knob 60 for displacing the bent portion 51a of the terminal pin 51 (not shown).

Now, the operation of the second embodiment of the present invention will be described. FIG. 4A shows a state where the memory card 2 is connected to the connector 1 for memory card 2. In this state, the locking plate 70 abuts on the left side wall of the groove 83 and the locking lip 71 stays in the cut out 2a of the memory card 2. Therefore, the memory card 2 is prevented from being pulled out. As the slide member (not shown) fixed to the manipulating knob 60 pushes the bent portion 51a of the terminal pin 51, the terminal pin 51 is brought out of contact with the terminal pin 53 and in contact with the terminal pin 52. In this state, the power supply is connected.

FIG. 4B shows the state where the manipulating knob 60 has been manipulated along the elongated slot 32 in the actuating plate 30' from the state shown in FIG. 4A, i.e., in the right hand direction as seen in the figure. The above manipulation moves the locking plate 70 to a position where the locking plate 70 abuts on the right side wall of the groove 83 so that the locking lip 71 is brought outside the sliding path of the memory card 2. At this time, the slide member (not shown) is displaced together with the manipulating knob 60 whose shaft 60a extends through the elongated slot 72 in the locking plate 70, so that the bent portion 51a of the terminal pin 51 turns about the terminal pin 51 in a counter-clockwise direction, thereby coming out of contact with the terminal pin 52 and into contact with the terminal pin 53. In this state, the power supply is disconnected. Note that in this case, the actuating plate 30' keeps the same position during the above operation. Therefore, the connection between the female connecting pins and the male connecting pins 11 of the connector 1 is maintained.

Figure 4C:
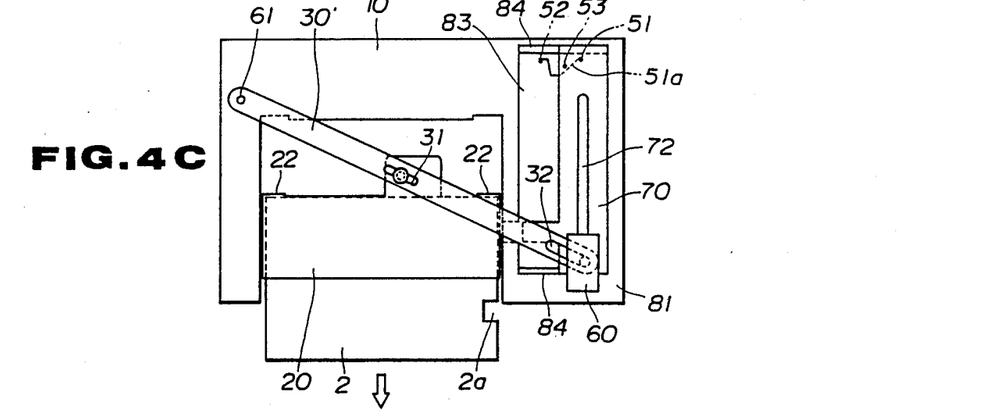

FIG. 4C shows the state where the manipulating knob 60 has been displaced in the right angle direction to the direction of movement of the manipulating knob 60 shown in FIG. 4B; that is, the knob 60 has been displaced along the elongated slot 72 in the locking plate 70. In this state, the actuating plate 30' turns about the stepped screw 61 in a clockwise direction so that the actuator 20 is moved in the same direction as the manipulating knob 60, thereby causing the upstanding piece 22 of the actuator 20 to carry out the memory card 2. Then the memory card 2 can be pulled out.

Thereafter, the manipulating knob 60 is manipulated to bring the connector 1 to the state as shown in FIG. 4B, which is ready for receiving the memory card 2 in the same manner as the first embodiment.

As described above, in these embodiments, the terminal pins of power supply are directly or indirectly fixed on the connector body. However, in another embodiment, the connector can be so constructed that a leaf spring having a contact point is fixed on the sliding member 40 for making contact with a connecting terminal formed on the circuit board. The actuator 20 has been described also to serve as a member to guide and support the memory card 2. However, such construction can be employed that a contact member is formed on the manipulating plate 30 or 30' to eject the memory card 2 and a support member is provided on the connector body 10 for supporting the memory card 2. In the above described embodiments, the locking piece 33 and lip 71 are formed as a unit on the actuating plate 30 and the locking plate 70 respectively. However, the locking piece 33 and lip 71 can be made of a separate member which is displaced in association with the movements of the actuating plate 30 and the locking plate 70. The construction wherein the locking piece 33 and lip 71 are made to support the rear end surface of the memory card 2 can eliminate the cut out 2a of the memory card 2. Further, such modification is also available that the actuator 20 is guided to slide on the external surface but not on the internal surface of the guide arm.

Figure 5:
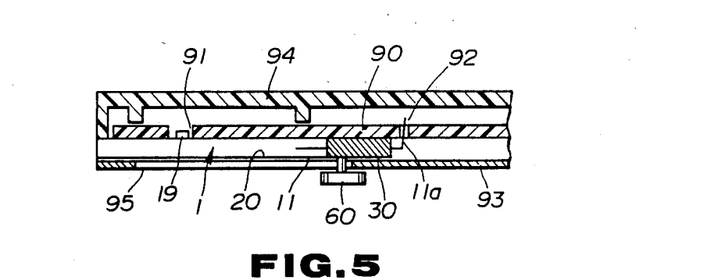
FIG. 5 is a sectioned side view of an apparatus which is equipped with a connector according to the present invention.

FIG. 5 shows an instance of the manner in which the above mentioned connectors 1 for the memory card 2 are installed on the electronic appliance.

The connector 1 for the memory card 2 is mounted on the circuit board 90 with its positioning projection 19 and the upper end portions 11a of its connecting pins 11 extending through the positioning slot 91 and the through hole 92 formed on the circuit board 90. Each connecting pin 11 is soldered to the connecting, terminal provided in the vicinity of the through hole 92 of the circuit board 90. The terminal pins 51, 52 and 53 are respectively connected to the predetermined connecting terminals of the circuit board 90. The bottom surface of the connector 1 is covered with the under panel 93 and the circuit board 90 is contained in the upper casing 94. The manipulating knob 60, which is located outside the under panel 93, is associated with the actuating plate 30 and the actuator 20 through the opening 95 formed in the under panel 93. The manipulating knob 60 is used to displace the actuating plate 30 and the actuator 20. The manipulating knob 60 can be contained in the opening 95 of the under panel 93. In this case, the opening 95 has to be formed wider than the movement range of the manipulating knob 60.

As described above, the loading and unloading mechanism of the memory card can be extremely efficiently installed on the electronic appliance.

In the illustrated embodiments, electrical connection between the memory card and the connector is realized by use of the male and female connector pins, but a plane contact, a leaf spring and the like are also applicable for electrically connecting the memory card and the connector. A light emitting element and a light receiving element can be used for an optical connection between the memory card and the connector.

What is claimed is:

1. A connector for a memory card, comprising:
a connector body for receiving a memory card, said connector body having a one piece structure which includes a central portion and a pair of guide arms, said guide arms being disposed at spaced apart positions along the width direction of said memory card so as to form a receiving space for receiving said memory card;
a plurality of connecting terminals mounted on said central portion of said connector body;
card ejecting means mounted on said connector body and including an actuator for ejecting said memory card away from said receiving space;
power supply means mounted on said connector body, and including:
at least two terminal electrodes which are arranged to make and break contact with each other; and
switching means for causing said at least two terminal electrodes to selectively make contact or break contact; and
actuating means, including an actuating member mounted on said connector body, for moving said actuator between a memory card receiving position and a memory card ejecting position and for moving said switching means between an on-position to cause said at least two terminal electrodes to contact and an off-position to cause said at least two terminal electrodes to break contact, responsive to an operation of said actuating member.

2. A connector according to claim 1, wherein each of said guide arms includes a depression portion for slidably guiding said actuator.

3. A connector according to claim 2, wherein said connector body includes positioning means for positioning said connector in an electronic apparatus.

4. A connector according to claim 1, wherein said connector body includes positioning means for positioning said connector in an electronic apparatus.

5. A connector for a memory card, comprising:
a connector body for receiving a memory card, said connector body having a one piece structure which includes a central portion and a pair of guide arms, said guide arms being disposed at spaced apart positions along the width direction of said memory card so as to form a receiving space for receiving said memory card;
a plurality of connecting terminals mounted on said central portion of said connector body;
power supply means mounted on said connector body, and including means for switching said power supply means from an ON to an OFF state, and vice versa;
card ejecting means mounted on said connector body for ejecting a memory card received in said receiving space of said connector body;
lock means carried on said connector body, for locking and unlocking said memory card received in said receiving space of said connector body, said lock means being movable between a first position for locking said memory card received in said receiving space and a second position for unlocking said received memory card;
coupling means for coupling said card ejecting means and said lock means so that both of said card ejecting means and said lock means are movable in association with each other;
actuating means mounted on said connector body for selectively setting said power supply means into said ON state and said OFF state; and
means for causing said actuating means to move in a manner that after said lock means is moved from said first position to said second position, said card ejecting means moves said memory card received in said receiving space to an ejected position at least partially out of said receiving space.

6. A connector according to claim 5, wherein said means for causing said actuating means to move includes means for enabling said actuating means to move in a direction different from a direction in which said power supply means is moved so as to be switched from said ON state to said OFF state.

7. A connector for a memory card, comprising:
a connector body for detachably receiving a memory card and having a plurality of connecting terminals adapted to be connected to a received memory card and a pair of guide arms for slidably guiding said memory card;
power supply means mounted on said connector body for switching said power supply means from an ON state to an OFF state;
card ejecting means mounted on said connector body for ejecting said received memory card, and having engaging means for engaging with said received memory card, said engaging means being movable in a direction of ejecting of said memory card received between said pair of guide arms;
lock means mounted on said connector body for locking said memory card, said locking means being movable between a first position for engaging with said memory card received between said pair of guide arms and a second position for disengaging from said memory card; and
coupling means for coupling said power supply means, said lock means and said engaging means with each other, said coupling means including first means for switching said power supply means between said ON state and said OFF state, second means for moving said lock means between said first position and said second position, and third means for causing said engaging means to engage with said memory card and for selectively moving said memory card in a direction to eject it and a receiving direction.

8. A connector according to claim 7, wherein said power supply means includes a first terminal adapted to be connected with ground potential, a second terminal adapted to be connected with a hot line of a power supply, a third terminal adapted to be connected with an active line to be activated and having an extension adapted to be normally connected with said first terminal and switching means for bringing said extension of said third terminal out of contact with said first terminal and in contact with said second terminal.

9. A connector for a memory card, comprising:
a connector body for receiving said memory card, said connector body having a one piece structure which includes a central portion and a pair of guide arms, said guide arms being disposed at spaced apart positions along the width direction of said memory card so as to form a receiving space for receiving said memory card;
a plurality of connecting terminals mounted on said central portion of said connector body;
power supply means mounted on said connector body, and including:
at least two terminal electrodes which are arranged to make and break contact with each other; and
switching means for causing said at least two terminal electrodes to selectively make contact to break contact;
lock means mounted on said connector body for locking and unlocking said memory card received in said receiving space of said connector body, and including a locking member which is movable between an inside position of said receiving space and an outside position of said receiving space;
actuating means, including an actuating member mounted on said connector body, for moving said locking member between said inside position and said outside position of said receiving space, and for moving said switching means between an on-position to make said terminal electrodes contact and an off-position to break contact between said terminal electrodes; and
means for allowing said locking member to move from said inside position of said receiving space to said outside position of said receiving space only when said terminal electrodes are set in said off-position.

10. A connector according to claim 9, further comprising a card ejecting mechanism coupled to said actuating means for ejecting said memory card outwardly of said receiving space.

11. A connector for a memory card, comprising:

a connector body for receiving a memory card, said connecting body having a pair of guide arms, said guide arms being disposed at spaced apart positions so as to form a receiving space for receiving said memory card, one of said guide arms having a groove therein which is elongated along a longitudinal direction of said one of said guide arms;

a plurality of connecting terminals mounted on said connector body;

power supply means mounted inside said groove of said connector body, and including
- at least two terminal electrodes which are arranged to be brought in contact and out contact with each other; and
- switching means for causing said at least two terminal electrodes to selectively be in contact and out contact with each other;

an actuator slidably mounted on said connector body and having a projecting member projecting to the inside of said receiving space; and an actuating member mounted on said connector body and coupled to said switching means of said power supply means and to said actuator such that said actuator may start moving said memory card loaded in said receiving space outward of said receiving space only after said terminal electrodes are set out of contact with each other upon movement of said switching means.

* * * * *